United States Patent [19]

Connelly et al.

[11] Patent Number: 5,387,405
[45] Date of Patent: Feb. 7, 1995

[54] BAYER LIQUOR POLISHING

[75] Inventors: Lawrence J. Connelly, Oak Lawn; Robert P. Mahoney, Glendale Heights; Ralph W. Kaesler, Clarendon Hills; Robert L. Wetegrove, Winfield, all of Ill.

[73] Assignee: Nalco Chemical Company, Naperville, Ill.

[21] Appl. No.: 82,145

[22] Filed: Jun. 24, 1993

Related U.S. Application Data

[63] Continuation of Ser. No. 857,213, Mar. 25, 1992, abandoned.

[51] Int. Cl.⁶ ............................ C01F 7/00; C02F 1/56
[52] U.S. Cl. ................................ 423/122; 423/121; 210/651; 210/654; 210/705; 210/710; 210/727; 210/730; 210/732; 210/733
[58] Field of Search .............. 423/121, 122, 130; 210/651, 654, 705, 710, 727, 730, 732, 733

[56] References Cited

U.S. PATENT DOCUMENTS

| 3,085,853 | 4/1963 | Lesinski et al. | 423/131 |
| 4,997,573 | 3/1991 | Browne | 210/714 |
| 5,008,089 | 4/1991 | Moody et al. | 423/121 |

FOREIGN PATENT DOCUMENTS

| 0367437 | 10/1989 | European Pat. Off. |
| 0352030 | 1/1990 | European Pat. Off. |

Primary Examiner—David Brunsman
Attorney, Agent, or Firm—Robert A. Miller; James J. Drake; Joseph B. Barrett

[57] ABSTRACT

A secondary polishing process for Bayer Process liquors suspension is described. The polishing process uses a combination of bio-polymers, particularly such bio-carbohydrates as dextran, with an inert insoluble solid, such as a filter aid, to treat the primary red mud settler overflow, then clarifying these treated overflow liquors in a secondary clarifier. Results provide for from 0–20 milligrams per liter suspended solids, often from 0–5 ppm suspended solids, and may make sand filter or Kelly filter operation an option in the Bayer Process.

6 Claims, 3 Drawing Sheets

BAYER LIQUOR POLISHING

This is a continuation of application Ser. No. 07/857,213, filed Mar. 25, 1992 now abandoned.

The Bayer Process for recovering alumina from bauxite is well known and comprises the digestion of bauxite ores in aqueous alkaline liquors providing for acquisition of sodium aluminate dissolved in these alkaline liquors. FIG. 1 provides a schematic representation of a typical Bayer Process including addition points of the present invention. This sodium aluminate solution also contains insoluble residues obtained from the bauxite ores which insoluble residues are separated in a primary settler or primary clarifier from the digestion liquor. The solids suspended in and separated from the digestion liquor in this primary settler or clarifier are called red mud. The red mud collected from the base or bottom of the primary clarifier is then often washed in a plurality of sequential wash stages, which prepare the red mud for landfill and also recover caustic values for recycle in the Bayer Process.

The overflow from the primary settler or primary clarifier still, however, contains, in some situations, finely divided red mud particulates primarily made up of iron oxides, iron hydroxides, and the like. The overflow from the primary settler often goes directly to a series of filters or presses, sometime sand filters and sometime referred to as Kelly filters. These filtration steps remove this finely divided suspended residual red mud solids prior to seeding and decreasing temperatures to force precipitation of alumina trihydrate, which is then separated and recovered from the Bayer Process liquor.

The Kelly filters are often treated with filter aids but still operate for relatively short periods of time prior to blinding, becoming a high maintenance item and forcing continuous manpower usage in the operation of the Bayer Process. After filtration, a clarified "green" liquor is obtained from which crystallization can occur.

It has been suggested that primary settler or primary clarifier overflow be treated with flocculants in a manner similar to the treatment used originally to separate the red mud from the red mud containing digestion liquor. This secondary clarification of primary red mud clarifier overflow requires another clarifier or settler which is referred to as a secondary red mud settler or clarifier, and this entire secondary clarification stage is occasionally referred to as Bayer liquor polishing.

PAST PRACTICES

In the past, Bayer liquor polishing or treatment of primary settler overflow with flocculants, and the addition thereof to a secondary clarification stage, has been taught by Moody, et. al., U.S. Pat. No. 5,008,089. Moody uses a combination of dextran and a synthetic anionic polymer to accomplish red mud flocculation in both primary and secondary clarification stages.

Lesinksi, et. al., U.S. Pat. No. 3,085,853, processes bauxite ores and teaches the use of dextrans in only primary red mud settlers.

Browne, U.S. Pat. No. 4,997,573 teaches a process for clarifying mining liquors in general by adding to various mining liquors containing suspended solids both a polymeric flocculant and a particulate material, thereby causing the formation of flocs, which flocs include both the suspended solids and the inert particulate material added purposefully to the mining liquors. These forced flocs are permitted to settle in a clarifier which recovers clarified mining liquors in the overflow, which liquors are free of the originally contaminating suspended solids. The Bayer Process is also discussed in the Browne patent.

Browne, however, discusses the removal of insoluble organic salt materials, such as sodium oxalate, from Bayer liquors and does not use his process in the Bayer Process area to treat red muds.

Also, Browne uses synthetic high molecular weight polymeric flocculants and does not teach or indicate the use of naturally occurring polysaccharides or bio-generated carbohydrate polymers.

Each of the three patents referenced above are incorporated herein by reference.

OBJECTS OF THE INVENTION

It is therefore an object of this invention to provide improvements in Bayer liquor polishing, which improvements are obtained by adding to the primary clarifier overflow liquor both an overflow liquor soluble carbohydrate polymer having a molecular weight of at least 5,000 and a particulated inert solid, both carbohydrate polymer and particulated inert solid being added at concentrations relative to the overflow liquor of at least 0.1 milligrams per liter.

It is further an object of this invention to achieve an extremely low suspended solids value in secondary clarifier overflow by the polishing of primary clarifier overflow liquor by the addition of the liquor soluble polysaccharide polymers derived from biological processes, which polymers can include but are not necessarily limited to dextran, zooglan, lactan, rhamsan, pullulan, starch, amylose, amylopectin, or mixtures thereof. The bio-carbohydrate polymer is preferably dextran.

The improvement in Bayer liquor polishing is preferably in the presence of filter aids which filter aids have a particle size of at least 0.5 microns and are selected from calcium oxide, limestones, calcium hydroxides, slaked limes, calcium carbonate, calcite, calcium aluminate, cellulose, crushed carbon, graphite, alumina, silica, iron oxides, including magnetite, hematite, or ilmenite, or mixtures thereof.

It is a further object of the invention to accomplish the Bayer liquor polishing so that the Bayer Process can continue with minimal maintenance to the sand filters or to the Kelly filters that normally operate after red mud clarification to prepare green liquor for the crystallization stages of the Bayer Process.

It is also an object of this invention to achieve such low levels of suspended solids by the Bayer liquor polishing steps to be described herein that sand filters and/or Kelly presses may be used optionally, if at all, in the Bayer Process. Potentially these filters may be eliminated in their entirety because of the results of the polishing steps to be described herein. By using our polishing technology, a Bayer Process operation may accomplish suspended solids ranging from essentially zero to no more than 5 mg/L.

THE INVENTION

Figure 1:
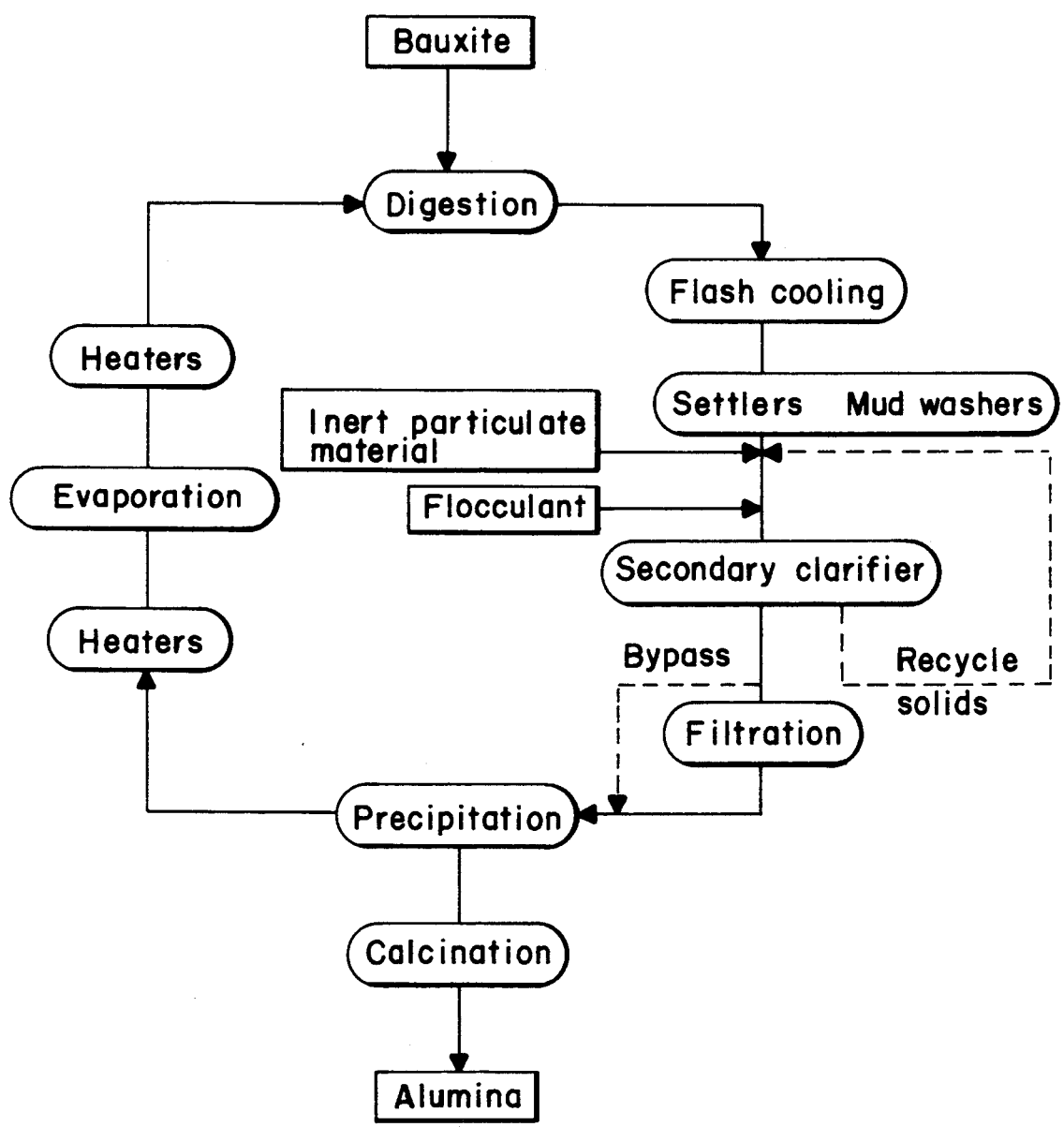
FIG. 1 is a schematic representation of a Bayer Process including a secondary clarifier operating unit.

We have discovered a method for improving the Bayer Process by preparing a primary clarifier overflow liquor for further processing to recover alumina trihydrate crystals, which method comprises the addition to the primary clarifier overflow liquor of both a soluble bio-carbohydrate polymer having a molecular weight of at least about 5,000 and a particulated solid which is inert and insoluble in the overflow liquor, both carbohydrate polymer and particulated solid being added to the overflow liquor at a concentration of at least 0.1 milligrams per liter of overflow liquor.

Our invention includes and prefers the use of a bio-carbohydrate polymer, which has a molecular weight of at least 10,000 and which is selected from the group consisting of dextran, zooglan, lactan, rhamsan, pullulan, starch, amylose, amylopectin, or mixtures thereof. Our invention also preferably operates with a particulated solid, which has a particle size of at least 0.5 microns and is selected from the group consisting of calcium oxide, limestones, calcium hydroxides, slaked limes, calcium carbonate, calcite, calcium aluminate, cellulose, crushed carbon, graphite, alumina, silica, magnetite, hematite, ilmenite, red mud, titanium oxides, or any admixture thereof.

Our invention also prefers the use of a bio-carbohydrate polymer selected from dextran, zooglan, pullulan, lactan, or mixtures thereof wherein the polymer has a molecular weight ranging from about 50,000 to about 7,500,000 and further wherein the particulated solid is a filter aid having a particle size ranging from about 10 to about 750 microns and said filter aid being selected from the group consisting of calcium oxide, calcium hydroxide, calcium carbonate, calcite, calcium aluminate, slaked lime, cellulose filter aids, or mixtures thereof.

Our methods primarily are beneficial when the particulated solid is added to the overflow liquors initially, admixed to achieve complete and thorough suspension within the overflow liquors, and then treated with the bio-carbohydrate polymers of choice in a secondary stage immediately prior to the addition to the clarifier or separator or flocculator device in which a prescribed settling time is achieved to separate the flocculated materials in the secondary polishing clarifier stages for red mud removal. However, the bio-carbohydrate polymer and the particulated solid may be added to the primary clarifier overflow simultaneously or the carbohydrate polymer may be added first followed by the particulated solid materials second. Good mixing of both materials should be accomplished prior to or in the secondary settler operation.

When using our invention, it is preferred that the bio-carbohydrate polymer to particulated solid weight ratios range from about 1:25 to about 1:2500. It is preferred obviously to use more of the particulated solid on a weight basis than the flocculant bio-carbohydrate polymer.

It is most preferred in the practice of our invention to use a bio-carbohydrate polymer which is a dextran having a molecular weight of about two million to about five million and using a particulated solid which is a filter aid selected from slaked lime, calcium oxide, calcium hydroxide, calcium carbonate, calcium aluminate, cellulosic filter aids, or mixtures thereof.

In attempting the use of other synthetic flocculants, such as polyacrylic acid or salts of polyacrylic acid, where the molecular weight of the acrylic acid based flocculants ranges from 250,000 to an excess of 20,000,000, we were unsuccessful at achieving clarification of the primary settler overflow by using the combination of the synthetic acrylic acid based flocculants with the filter aids useful in this invention. We were most surprised to find that the use of dextrans and other biopolymers, particularly carbohydrate biopolymers with the filter aids provide such a superior result in terms of removing the suspended solids from the primary settler overflow liquors to acceptable levels of less than 5 milligrams per liter.

THE POLYMERIC FLOCCULANTS—BIOPOLYMERS

The polymeric flocculants of this invention are preferred to include bio-carbohydrate polymers or polysaccharide polymers having a molecular weight of at least 10,000, preferably at least 50,000, and most preferably at least 1,000,000. These polymers are selected from the group consisting of dextran, zooglan, lactan, rhamsan, pullulan, amylose, amylopectin, starches, or admixtures thereof. Dextran is a polysaccharide primarily derived from 1,6-anhydro glucose units, which material is obtained by microbial polysaccharide production as described in the references earlier cited and incorporated herein.

The lactan, zooglan, rhamsan, pullulan materials are also referred to as microbial polysaccharides, or biopolymers, made by specific microbiological organisms, and are polysaccharides which can contain repeating units selected from the group consisting of glucose, galactose, pyruvate, succinate, mannose, galacturonic acid, and the like. These biologically induced polysaccharides can have molecular weights ranging from at least 10,000, up to about several million, and as high as 7,500,000, or above. These "all natural" polysaccharides have varying properties depending upon the so-called "sugar" repeating unit contained in the polymeric backbone, which can vary polymer chain stiffness, molecular weights, and the like. Some of these materials often are slightly anionic because of the inclusion, in the process of microbiological generation of these materials, of anionically charged materials, such as pyruvate, succinate, and the galacturonic acid units.

The biologically generated polysaccharides are derived by their generic names but are primarily materials derived from microbial action using different nutrients, such as milk wheys, milk whey permeates, and other dairy industry waste products. Also, other nutrients can include lactose, sucrose, glucose, starches, degraded starches, and other sugar sources, mannose galactose, or mixtures thereof. Specific microbiological organisms can induce synthesis of different biologically generated microbial polysaccharides. Although plant gums, starches, and starch fractions, such as amylose and amylopectin may also be useful in these inventions, it is more likely that the improved results obtained in the invention will be obtained by the microbial polysaccharides, such as dextran, lactan, rhamsan, pullulan, and zooglan, or mixtures thereof.

Although we have found that synthetic polymers, such as the acrylic acid based flocculants having molecular weights ranging from 250,000 to as high as 20,000,000, do not provide good results in combination with filter aids and suspended particulated solids useful in our invention, it is believed that the combination of our biologically generated polysaccharide carbohydrate polymers with synthetic polymers, such as the homopolymers of acrylic acid may provide additional benefits in the clarification and polishing of primary red mud clarifier overflow liquors.

Dextran

Structure A

"Dextrans are a class of polysaccharides synthesized from sucrose by bacterial enzymes (dextransucrases, glucansucrases, or glucosyltransferases) to give D-glucans with contiguous α-1,6 gluosidic linkages in the main chains and a variable amount of α-1,2; α-1,3; or α1,4 branch linkages."

Dextran is produced by *Leuconostoc mesenteroides* NRRL B-512 (F), and others, from sugar sources including sucrose.

PULLULAN

Structure B "The pullulan molecule can be considered as a chin of amylose, the linear component of starch, in which an α-1,6 bond replaces every third α-1,4 bond. The 1,6 bond introduces flexibility, and the interruption of regularity results in making pullulan readily soluble."

Pullulan is a high molecular weight α-D-glucan produced by black yeasts like *Pullularia pullulans, Aureobasidium pullulans*, and others; vadous sugars and starches can be used as its food source. Pullulan is a linear polymer of D-glucopyranosyl units that alternate regularly between one α-1,6-D and two α-1,4-D linkages.

LAGTAN

Lactan is a high molecular weight anionic polysaccharide, made up of mannose, galactose, and galacturonic acid units by the lactose-utilizing bacterium, ATCC-55046.

ZOOGLAN

Zooglan is a high molecular weight anionic polysaccharide, made up from glucose and galactose units, with succinate and pyruvate on the backbone.

RHAMSAN

Structure C

Rhamsan is a high molecular weight microbial polysaccharide. Rhamsan gum is produced by aerobic fermentation using an alcaligenes strain ATCC-31961. The biopolymer backbone is composed of D-glucose, D-glucuromic acid, D-glucose, and L-rhamnose units with a two glucose residue side chain.

Structure A

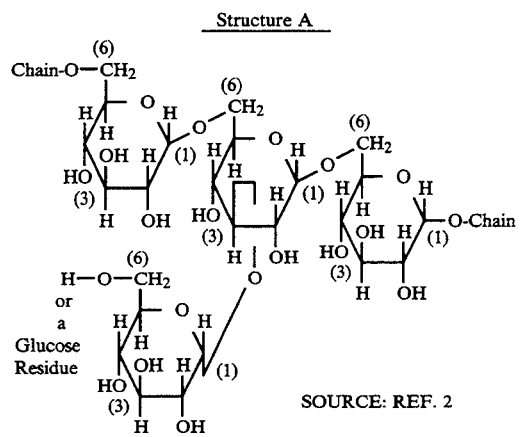

Structural features of dextran from Leucenostoc mesenteroides NRRL B-512(F)

SOURCE: REF. 2

Structure B

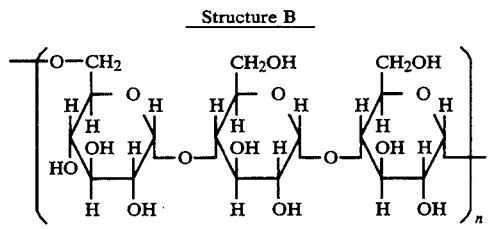

The characteristic structural features of pullulans: α-maltotriose polymerized through α-1,6-linkages Structure C

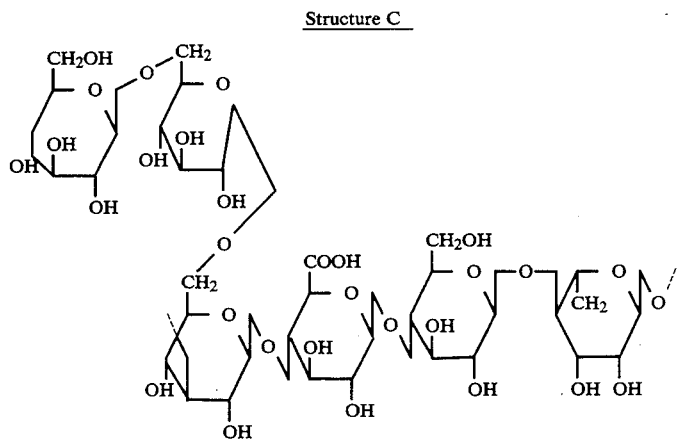

-3)-β-D-Glcp-(1-4)-β-D-GlcpA-(1-4)-β-D-Glcp-(1-4)-α-L-Rhap-(1-

Structure C

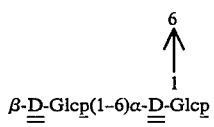

β-D-Glcp(1-6)α-D-Glcp    SOURCE: REF. 3

Rhamsan gum chemical repeat unit.

"Encyclopedia of Polymer Science & Engineering" 2nd Ed., Vol. 4, H. F. Mark, et al, eds. Wiley, N.Y., 1986, p. 752.

A. Jeanes in "Extracellular Microbial Polysaccharides," P. A. Sandford and A. Laskin, eds., ACS Symp. Ser. 45 (1977), p. 289.

THE PARTICULATED SOLIDS

The particulated solids useful in the invention are those particulated solids having a particle size of less than 5 mm, and preferably a particle size ranging from about 10 to about 750 microns. This particle size also can be described in terms of either a Tyler mesh size or a U.S. mesh size ranging from about 220 on both the Tyler or U.S. scales to as high as 500 on both the Tyler or U.S. mesh scales. Preferably, the particulated solids are filter aids that are being used in the Bayer Liquor Process as practiced by the operator of this process. Each operator has proprietary techniques for making these filter aids but often these filter aids are calcium oxides, limestones, calcium hydroxides, slaked limes, calcium carbonates, calcites, calcium aluminates, mixtures thereof, and the like. Other filter aids, such as cellulose, crushed carbons, graphites, aluminas, silicas, magnetites, hematites, ilmenites, red mud, titanium oxides, or mixtures thereof may be used.

Proprietary filter aids are often those filter aids, which are formed on site within the Bayer operator's plant by proprietary techniques known only to the operator. Some of these techniques can include slaking a particulated lime using Bayer liquor containing sodium aluminate values so as to form a filter aid, which can be a calcium hydroxide, lime interior particulate coated with calcium aluminate surface character.

It is preferred to use the filter aids that are used in the plant along with our microbial polysaccharide carbohydrate polymers, particularly when the filter aid is based calcium oxide, calcium hydroxide, slaked limes, calcium carbonate, calcium aluminate, or cellulosic filter aids. Any combination of these filter aids may also be useful in the invention.

When the filter aid is used, it is normally used at concentrations of at least 0.1 milligrams per liter, but preferably used at concentrations of at least 50 milligrams per liter up to and including 1 to 5 grams liter of filter aid, lime, or slaked lime solids. In the preferred operation of our invention, the weight ratio of these filter aid based particulated solids relative to the microbial polysaccharide flocculants used ranges from about 25:1 to about 2500:1, preferably operation is within the weight ratio of from about 50:1 to about 1,000:1.

In actual plant operation, fresh filter aid or slaked lime requirements may be reduced by recycling at least some portion of the underflow from the secondary or Bayer liquor polishing clarifier.

OPERATIONAL PARAMETERS

When operating a secondary clarifier using the primary clarifier overflow containing finely divided and suspended red mud particulate matter, it is anticipated that our carbohydrate polymer will be added at concentrations ranging from about 0.1 milligrams per liter to about 50 milligrams per liter. Preferably, the polymer should be added at a concentration relative to total volume of overflow liquor treated of from about 0.5 mg/L to about 20 mg/L, and most preferably, between about 1 mg/L to about 10 mg/L polysaccharide flocculant polymer. The filter aid normally is pre-mixed by adding lime or slaked lime or any of the other filter aids to water or spent Bayer liquors to achieve a suspension containing from about 1 to about 100 grams per liter of the filter aid. Preferably, the suspension contains from about 30 to about 60 grams per liter and most preferably, the suspension can contain from about 40 to about 50 grams per liter of the filter aid. This filter aid suspension is then added to the primary settler overflow so as to provide from about 0.05 grams per liter filter aid to about 10 grams per liter filter aid in the overflow water. Preferably, the concentration of filter aid ranges from about 0.2 grams per liter to about 5 grams per liter filter aid in the overflow liquors from the primary settlers.

Although the microbial polysaccharide carbohydrate flocculant polymer can be added simultaneously with these filter aids or particulate solids, or in fact, may be added prior to the addition of the filter aid or particulate solid, it is preferred to add the flocculant after the filter aid or particulate solid has been added to the overflow liquors and dispersed therein. The flocculant is normally added at a concentration of at least 0.5 milligrams per liter but is preferably added at a concentration ranging from about 0.5 milligrams per liter to about 10 milligrams per liter. Mixing can occur within a time period of from about 1 second to about 15 minutes or more, and clarification settling is potentially complete within at least 30 minutes, but normally occurs within from 30 minutes to about 8 hours, or more.

Industrial operation of this secondary clarifier can provide a solids settling rate of from about 9 inches per hour up to about 50 feet per hour, or more.

EXPERIMENTAL

To provide demonstration of the usefulness of our invention, the following data is provided in the tables. In these tables 500 milliliter samples of primary settler clarifier overflow were obtained from a primary settler separating red mud from the original suspension of red mud in Bayer liquors. The filter aid was pre-mixed in Bayer liquors primarily using limes slaked with Bayer liquor. The filter aids were pre-mixed in a slurry containing from about 30 to about 50 grams per liter suspended solids. In each table, a constant concentration of filter aid was used although from table to table, the filter aid concentrations were varied.

The dextrans were used at molecular weights ranging from about 4,000 to about 5 million and, where appropriate, other microbial polysaccharides were tested and are presented below.

Suspended solids, also referred to as clarity, are provided in milligram per liter at varying settling times ranging from about 30 to about 65 minutes, or above.

EXAMPLES

Procedure

The general procedure for laboratory testing of liquor polishing is described here, any variations being listed in the individual examples.

1. measure out 500 mL of settler overflow into each 600 mL beaker. Cover the beakers and keep them heated to 190° F. in a water bath, 2. To run each test, place a beaker containing settler overflow onto a stir plate and agitate with a magnetic stir bar at a constant speed. Add lime solids and continue stirring for one minute, then add a flocculant and stir for an additional three minutes.

3. Cover the sample, then return it to the water bath for temperature control at 190° F. for 30 to 60 minutes, Measure the suspended solids level in a sample drawn from 1.5 inches below the liquid surface.

EXAMPLE 1

A series of experiments was conducted using settler overflow containing 104 mg/L suspended solids at bauxite refinery A. Suspended solids were determined at 30 and 60 minutes settling time.

TABLE I

| Test No. | (g/L) Lime Solids | (mg/L) Dextran of MW 2-5 million | Suspended Solids at 30 min (mg/L) | Suspended Solids at 60 min (mg/L) |
|---|---|---|---|---|
| 1 | 0 | 2.0 | 85 | 82 |
| 2 | 0.08 | 2.0 | 60 | 66 |
| 3 | 0.17 | 2.0 | 79 | 62 |
| 4 | 0.42 | 2.0 | 72 | 30 |
| 5 | 0.84 | 2.0 | 56 | 26 |
| 6 | 1.7 | 2.0 | 59 | 19 |
| 7 | 0 | 0 | 100 | 80 |

Tests 1 and 7 show that dextran alone is ineffective at reducing suspended solids. Tests 2 through 6 show the trend of increasing lime solids dose causing lower suspended solids after settling.

EXAMPLE 2

A series of experiments was conducted using settler overflow containing 86 mg/L suspended solids at bauxite refinery A. Suspended solids were determined at 30 and 60 minutes settling time.

TABLE II

| Test No. | (g/L) Lime Solids | Flocculant | (mg/L) Dose | Suspended Solids at 30 min (mg/L) | Suspended Solids at 65 min (mg/L) |
|---|---|---|---|---|---|
| 1 | 3.4 | — | 0 | 108 | 55 |
| 2 | 3.4 | dextran (MW = 2-5 million) | 10.0 | 7 | 5 |
| 3 | 3.4 | dextran (MW = 2-5 million) | 4.0 | 6 | 10 |
| 4 | 3.4 | polyacrylate (MW = 250,000) | 10.0 | 118 | 56 |
| 5 | 3.4 | polyacrylate (MW = 250,000) | 40.0 | 109 | 52 |
| 6 | 3.4 | polyacrylate (MW = 10 million) | 20.0 | 110 | 62 |

Figure 2:
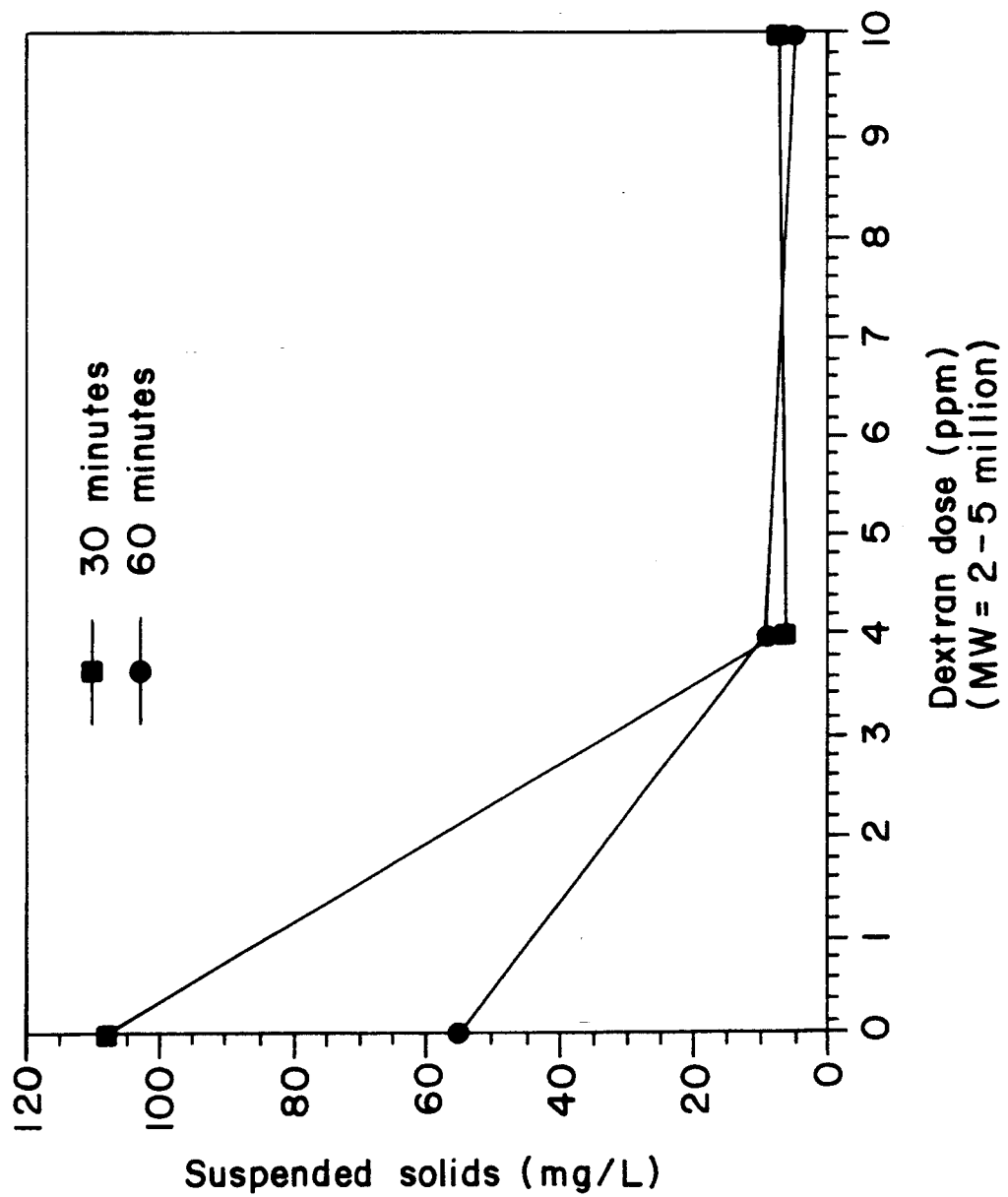
FIG. 2 is a graphical representation of suspended solids achieved by treating primary settler overflows obtained from an operating Bayer Process.

Tests 1, 2, and 3 show that dextran improves (reduces) suspended solids when used with lime solids. Tests 1, 4, and 5 show that polyacrylates are not effective in removal of suspended solids in this type of application. This data is graphically reprinted in FIG. 2.

EXAMPLE 3

A series of experiments was conducted using settler overflow containing ~95 mg/L suspended solids at bauxite refinery A. The amount of mixing after addition of the lime solids was varied, and suspended solids were determined at 30 minutes settling time.

TABLE III

| Test No. | (g/L) Lime Solids | (min) Mixing Time | (MW = 2-5 million) (mg/L) Dextran | Suspended Solids at 30 min (mg/L) |
|---|---|---|---|---|
| 1 | 0.42 | 16 | 4.0 | 47 |
| 2 | 0.42 | 8 | 4.0 | 44 |
| 3 | 0.42 | 4 | 4.0 | 40 |
| 4 | 0.42 | 1 | 4.0 | 35 |
| 5 | 3.4 | 4 | 4.0 | 21 |
| 6 | 3.4 | 1 | 4.0 | 18 |

Tests 1, 2, 3, and 4 show that less mixing results in lower suspended solids after liquor polishing. Tests 3, 4, 5, and 6 show that a higher dose of lime solids is more effective at removing suspended solids from settler overflow.

EXAMPLE 4

A series of experiments was conducted using settler overflow containing 56 mg/L suspended solids at bauxiate refinery A. Suspended solids were determined at 30 minutes settling time.

TABLE IV

| Test No. | (g/L) Lime Solids | Flocculant | (mg/L) Dose | (Min) Mixing Time | Suspended Solids at 30 min (mg/L) |
|---|---|---|---|---|---|
| 1 | 2.4 | Daxtran A | 10 | 1/3 | 0 |
| 2 | 2.4 | Dextran A | 4 | 1/3 | 0 |
| 3 | 2.4 | Dextran A/Dextran A | 5/5 | 1/1.5/1.5 | 0 |
| 4 | 2.4 | Dextran A/Dextran A | 2/2 | 1/1.5/1.5 | 1 |
| 5 | 2.4 | Dextran A/polyacrylate A | 4/2 | 1/2/1 | 3 |
| 6 | 2.4 | Dextran A/polyacrylate A | 10/2 | 1/2/1 | 0 |
| 7 | 2.4 | | 0 | 4 | 74 |
| 8 | 0 | Dextran A | 10 | 3 | 14 |
| 9 | 2.4 | Dextran A | 2 | 1/3 | 4 |
| 10 | 2.4 | Dextran A | 1 | 1/3 | 21 |
| 11 | 2.4 | Dextran A | 0.5 | 1/3 | 39 |

TABLE IV-continued

| Test No. | (g/L) Lime Solids | Flocculant | (mg/L) Dose | (Min) Mixing Time | Suspended Solids at 30 min (mg/L) |
| --- | --- | --- | --- | --- | --- |
| 12 | 1.2 | Dextran A | 2 | 1/3 | 3 |
| 13 | 0.6 | Dextran A | 2 | 1/3 | 24 |
| 14 | 0.3 | Dextran A | 2 | 1/3 | 18 |
| 15 | 2.4 | Polyacrylate B | 10 | 1/3 | 45 |
| 16 | 2.4 | Polyacrylate B | 20 | 1/3 | 75 |
| 17 | 2.4 | Polyacrylate B | 50 | 1/3 | 62 |
| 18 | 2.4 | Polyacrylate A | 2 | 1/3 | 36 |

Figure 3:
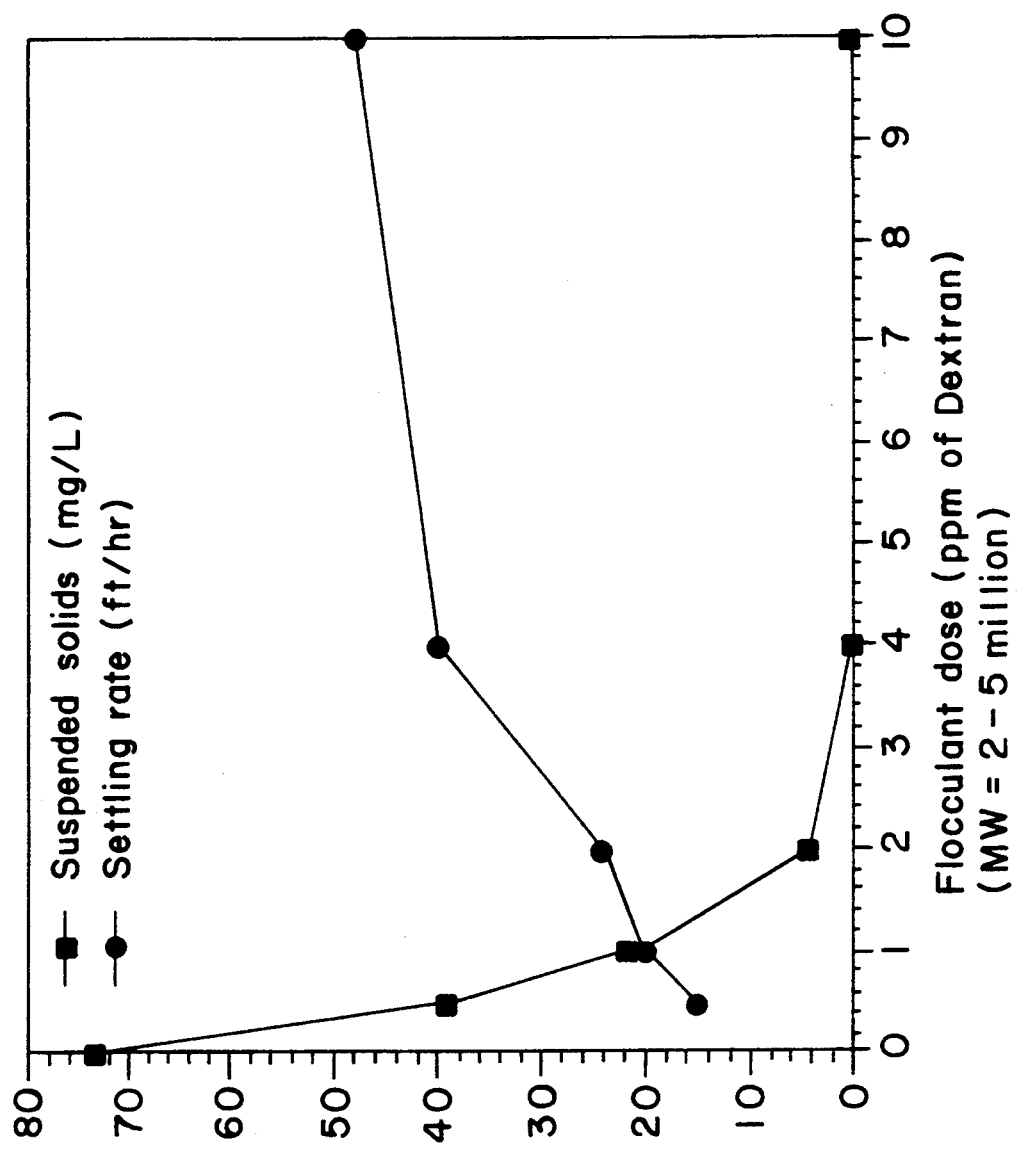
FIG. 3 is a graphical representation of secondary clarification of dextran dose is plotted against suspended solids and settling rates.

Dextran A is of MW 2-14 5 million
Polyacrylate A is of MW 10 million
Polyacrylate B is of MW 250 thousand Tests 1-6, 9, and 12 show excellent performance is suspended solids removal, producing a liquor with little or no detectable solids content. Addition of polyacrylate with lime and dextran (Tests 5 and 6) had simile results to lime and dextran alone (Tests 1 and 2). Lime with no flocculant (Test 7) give poor clarify, and dextran with no lime (Test 8) was not as effective as dextran with lime. A dosage profile of dextran with constant lime dose is shown in Tests 1, 2, 9, 10, and 11; below a dose of 2 mg/L dextran the clarify degrades. A dosage profile of lime is shown in Tests 9, 12, 13, and 14; below a dose of 1.2 mg/L lime solids tins clarity degrades. Tests 15, 16, 17, and 18 show that polyacrylates are not suitable as flocculants for this application. FIG. 3 summarizes the above data.

EXAMPLE 5

A series of experiments was conducted using settler overflow containing 69 mg/L suspended solids at bauxite refinery A. Suspended solids were determined at 40 minutes settling time.

TABLE V

| Test No. | (g/L) Lime Solids | (mg/L) Lactan | Suspended Solids at 40 min (mg/L) |
| --- | --- | --- | --- |
| 1 | 0 | 0 | 69 |
| 2 | 2.5 | 0 | 93 |
| 3 | 0 | 4.0 | 29 |
| 4 | 2.5 | 4.0 | 16 |

Tests 1 and 2 show that adding lime in the absence of a flocculant results in higher suspended solids. Tests 3 and 4 show that adding lime and adding the flocculant lactan results in lower suspended solids.

EXAMPLE 6

A series of experiments was conducted using settler overflow containing 12 mg/L suspended solids from bauxite refinery B. In these tests, a mixing time of 3 minutes was used after adding the lime solids (see Step 2 of Procedure). Suspended solids were determined at 50 minutes settling time.

TABLE VI

| Test No. | (g/L) Lime Solids | Flocculant | Flocculant Dose (mg/L) | Suspended Solids at 50 min (mg/L) |
| --- | --- | --- | --- | --- |
| 1 | 1.0 | — | 0 | 5 |
| 2 | 1.0 | Zoogian | 4.0 | 3 |
| 3 | 1.0 | Lactan | 4.0 | 2 |
| 4 | 1.0 | Rhamsan | 4.0 | 7 |
| 5 | 1.0 | Dextran A | 4.0 | 1 |
| 6 | 0 | Zoogian | 4.0 | 8 |
| 7 | 0 | Lactan | 4.0 | 6 |
| 8 | 0 | Rhamsan | 4.0 | 8 |
| 9 | 0 | Dextran A | 4.0 | 8 |

TABLE VI-continued

| Test No. | (g/L) Lime Solids | Flocculant | Flocculant Dose (mg/L) | Suspended Solids at 50 min (mg/L) |
| --- | --- | --- | --- | --- |
| 10 | 1.0 | Starch | 40.0 | 4 |
| 11 | 0 | — | 0 | 12 |

Dextran A is of MW 2-5 million.

Tests 1 and 11 show that adding lime and no flocculant reduces suspended solids to some extent, and the additional actions of zooglan, lactan, dextran, and starch are seen in Tests 2, 3, 5, and 10. Rhamsan is not effective as a liquor polishing flocculant, as seen in Tests 1 and 4. None of the flocculants are effective without lime solids, as seen in Tests 6, 7, 8, and 9.

EXAMPLE 7

A series of experiments was conducted using settler overflow containing 39 mg/L suspended solids from bauxite refinery B. A mixing time of 3 minutes was used after adding the lime solids (see Step 2 of Procedure). Suspended solids were determined at 45 minutes settling time.

TABLE VII

| Test No. | (g/L) Lime Solids | Flocculant | Dose (mg/L) | Suspended Solids at 45 min (mg/L) |
| --- | --- | --- | --- | --- |
| 1 | 1.0 | — | 0 | 9 |
| 2 | 1.0 | Polyacrylate A | 0.02 | 11 |
| 3 | 1.0 | Polyacrylate A | 20 | 10 |
| 4 | 0 | Polyacrylate A | 0.02 | 42 |
| 5 | 0 | Polyacrylate A | 20 | 41 |
| 6 | 1.0 | Dextran A | 4 | 2 |
| 7 | 0 | Dextran A | 4 | 15 |
| 8 | 1.0 | Dextran A/ Polyacrylate A | 4/4 | 4 |
| 9 | 0 | Dextran A/ Polyacrylate A | 4/4 | 20 |
| 10 | 1.0 | Dextran A | 2 | 2 |
| 11 | 0 | — | 0 | 39 |

Dextran A is of MW 214 5 million
Polyacrylate A is of MW 10 million

Lime solids reduced suspended solids from 39 to 9 mg/L (Tests 1 and 11). Polyacrylate caused no reduction in suspended solids (Tests 4, 5, and 11) and polyacrylate with lime solids performed no better than lime solids alone (Tests 1, 2, and 3). Dextran alone gave some reduction of suspended solids (Tests 7 and 11 ), but dextran with lime solids gave the best performance (Tests, 1, 6, and 10). Addition of polyacrylate with the dextran harmed performance (Tea 6 and 7 vs Tests 8 and 9).

EXAMPLE 8

A series of experiments was conducted using settler overflow containing 23 mg/L suspended solids from bauxite refinery C. A mixing time of three (3) minutes was used after adding the solids (lime or cellulose), but the standard procedure was otherwise followed. Suspended solids were determined at 15 minutes settling time.

Tests 1–4 show that the combination of dextran and lime solids is more effective at removal of suspended solids than either dextran or lime alone (see Table Example 8). Tests 1,4, and 8–10 show that lime solids may be substituted by red mud or cellulose solids. Tests 1–6 show that addition of a polyacrylate with dextran results in no improvement over dextran as the flocculant. Tests 3, 11, and 12 show that high molecular weight (MW) dextran is preferred, but dextrans from MW 15,000 to MW 5,000,000 are effective at removing suspended solids. Tests 3 and 13 show that increasing the dextran dose from 2 to 4 mg/L does not change the amount of suspended solids removed. Tests 14 and 15 show that when using cellulose as solids, increasing dextran dose further reduces suspended solids.

TABLE VIII

Summary of Liquor polishing results
EXAMPLE 8

| Test No. | Solids | Dose of Solids (g/L) | Flocculant | (mg/L) Dose of Flocculant | Suspended Solids at 15 min (mg/L) |
| --- | --- | --- | --- | --- | --- |
| 1 | — | 0 | — | 0 | 18 |
| 2 | lime | 1.5 | — | 0 | 22 |
| 3 | lime | 1.5 | (MW 2–5 million) dextran | 2 | 2.5 |
| 4 | — | 0 | (MW 2–5 million) dextran | 2 | 11 |
| 5 | — | 0 | polyacrylate A + dextran A | 2 + 2 | 11 |
| 6 | lime | 1.5 | polyacrylate A + dextran A | 2 + 2 | 5 |
| 7 | red mud* | 1.5 | — | 0 | 77 |
| 8 | red mud* | 1.5 | dextran (MW = 2–5 million) | 2 | 9 |
| 9 | cellulose | 1.8 | — | 0 | 10 |
| 10 | cellulose | 1.8 | dextran (MW = 2–5 million) | 2 | 5 |
| 11 | lime | 1.5 | (MW 15–20,000) dextran | 2 | 6 |
| 12 | lime | 1.5 | (MW 4–6,000) dextran | 2 | 18 |
| 13 | lime | 1.5 | (MW 2–5 million) dextran | 4 | 2.5 |
| 14 | cellulose | 0.2 | (MW 2–5 million) dextran | 0.5 | 9 |
| 15 | cellulose | 0.2 | (MW 2–5 million) dextran | 10 | 5 |

*Recovered from primary settler/clarifier
Dextran A is of MW 2–5 million
Polyacrylate A is of MW 10 million

EXAMPLE 9

A series of experiments was conducted using settler overflow containing 244 mg/L suspended solids from bauxite refinery D. A mixing time of three minutes was used both after adding the solids and the flocculant. The order of addition was reversed in tests 3, 6, and 8–11, but the standard procedure was otherwise followed. Suspended solids were determined at 15 minutes settling time.

TABLE IX

| Test No. | Treatment | Dose (mg/L) | Suspended Solids at 15 min. (mg/L) |
| --- | --- | --- | --- |
| 1 | — | — | 244 |
| 2 | Dextran A | 3.3 | 120 |
| 3 | Dextran A/Lime | 3.3/1250 | 10 |
| 4 | Lime/Dextran A | 1250/3.3 | 20 |
| 5 | Lime | 1250 | 75 |
| 6 | Dextran A/Lime | 3.3/417 | 72 |
| 7 | Lime/Dextran A | 417/3.3 | 32 |
| 8 | Dextran A/Lime | 3.3/167 | 56 |
| 9 | Dextran A/Lime | 3.3/42 | 80 |
| 10 | Dextran A/Lime | 1.7/167 | 100 |
| 11 | Dextran A/Lime | 0.3/167 | 94 |

(Dextran A is of MW 2–5 million)

Tests 1–7 show that dextran and lime, added in either order, reduce the level of suspended solids more than dextran alone or lime alone. Tests 3, 6, 8, and 9 show that increasing lime dose decreases suspended solids. Tests 8, 10, and 11 show that increasing dextran dose reduces suspended solids.

EXAMPLE 10

A series of experiments was conducted using settler overflow containing 244 mg/L suspended solids from bauxite refinery D. A mixing time of 3 minutes was used both after adding the solids and the flocculant, but the standard procedure was otherwise followed. Suspended solids were determined at 15 minutes settling time.

TABLE X

| Test No. | Treatment | Dose (mg/L) | Suspended Solids at 15 min. (mg/L) |
| --- | --- | --- | --- |
| 1 | — | — | 244 |
| 2 | Lime | 1250 | 75 |
| 3 | Pullulan | 17 | 196 |
| 4 | Lime/Pullulan | 1250/17 | 2 |

Tests 1–4 show that the combination of lime and pullulan results or lower levels of suspended solids than from either component alone.

EXAMPLE 11

A series of experiments-was conducted using settler overflow containing 244 mg/L suspended solids from bauxite refinery D. A mixing time of 3 minutes was used both after adding the solids and the flocculant, but the standard procedure was otherwise followed. Suspended solids were determined at 15 minutes settling time.

TABLE XI

| Test No. | Treatment | Dose (mg/L) | Suspended Solids at 15 min. (mg/L) |
| --- | --- | --- | --- |
| 1 | — | — | 244 |
| 2 | Dextran A | 3.3 | 120 |
| 3 | Red mud/Dextran A | 1250/17 | 50 |
| 4 | Red mud | 1250 | 244 |
| 5 | $TiO_2$/Dextran A | 1670/6.7 | 0 |
| 6 | $TiO_2$ | 1670 | 320 |

(Dextran A is of MW 2–5 million)

Tests 1–6 show that red mud and $TiO_2$ are both suitable solids for liquor polishing with dextran as the flocculant.

SUMMARY OF THE INVENTION

We have developed a new technique for polishing finely divided red mud suspension from primary red mud settler overflow liquors by adding at least 0.1 milligrams per liter of a microbial polysaccharide carbohydrate polymer flocculant to these liquors either at the same time or separately with the addition of a particulated solid, particularly a filter aid, which filter aid is characterized as having a particle size of at least 10 microns, and preferably, from about 50 to about 750 microns in which particle filter aid may be either inorganic or organic and is inert and insoluble in the Bayer liquor overflows from the primary red mud clarifier.

By the term "inert", we mean that the particulate material is not substantially attacked by the liquor or dissolved therein. The particulate material exhibits both suitable chemical and physical stability when dispersed within the liquor and is therefore "inert".

Preferably, the particulated solid is added at at least 0.1 milligrams per liter, but most preferably is added at a weight ratio relative to the bio-carbohydrate flocculant polymer ranging from about 25:1 particulate filter aid to flocculant polymer to about 2500:1 particulate filter aid to polymer.

The operation is preferred to incorporate the filter aids, admixed with the overflow liquors to provide a suspension which is then treated with the bio-carbohydrate polymer flocculant.

By so doing, we have achieved dramatically improved clarity in the Bayer liquor overflow from a secondary red mud clarifier accepting and settling out the solids obtained from the practice of this invention. The underflow from the secondary clarifier may be at least partially recycled to achieve economies.

The most preferred microbial polysaccharide carbohydrate polymer is dextran, and the most preferred filter aid particulate solid is a slaked lime filter aid.

Primary settler overflow liquors containing from about 10 milligrams per liter suspended solids to in excess of 300 milligrams per liter suspended solids have been treated by the above process so as to achieve anywhere from to 0 to about 20 milligrams per liter suspended solids in the secondary clarifier overflows after the practice of our invention. This would provide increased operational volume in the Bayer Process by eliminating or minimizing the use of Kelly filters or sand filters to polish green Bayer liquor prior to crystallization of alumina trihydrate therefrom.

It is estimated that the reduction of the overflow solids from an average of about 170 milligrams per liter to an average of about 50 milligrams per liter would reduce the cost of operating the Kelly filtration system in a typical Bayer Process from about half a million of dollars to about 2 million dollars per year. It is noted that sand filters, often used by other Bayer Process operators, are more expensive to operate than the Kelly filter process.

It has also been found that the use of synthetic polymers based on acrylic acid, even in combination with the filter aids of this invention, do not provide the excellent results of the practice of this invention relative to obtaining low levels of suspended solids in this Bayer liquor polishing step.

Having described our invention, we claim:

1. A method of preparing a primary clarifier overflow liquor for further processing to recover alumina trihydrate which method comprises the addition to the primary clarifier overflow liquor of both a soluble carbohydrate polymer having a molecular weight of at least about 5,000 and a particulated solid which is insoluble in the overflow liquor, both carbohydrate polymer and particulated solid being added at a concentration of at least 0.1 mg per liter of overflow liquor.

2. The method of claim 1 wherein the carbohydrate polymer has a molecular weight of at least 10,000 and is selected from the group consisting of dextran, zooglan, lactan, rhamsan, pullulan, amylose, amylopectin, starch and admixtures thereof, and the particulated solid has a particle size of at least 10 microns and is selected from the group consisting of CaO, limestone, $Ca(OH)_2$, slaked lime, calcium carbonate, calcite, calcium aluminate, cellulose, titanium oxides, red mud, crushed carbon, graphite, alumina, silica, magnetite, hematite, ilmenite, and mixtures thereof.

3. The method of claim 1 wherein the carbohydrate polymer is a polysaccharide selected the group consisting of from dextran, zooglan, pullulan, lactan, and mixtures thereof, and the polymer has a molecular weight ranging from about 50,000 to about 7,500,000; and wherein the particulated solid is a filter aid having a particle size ranging from about 10 to about 750 microns, the filter aid being selected from the group consisting of CaO, $Ca(OH)_2$, calcium carbonate, calcite, calcium aluminate, slaked lime, cellulose, titanium oxides, and mixtures thereof.

4. The method of claim 1 wherein the carbohydrate polymer and particulated solid are added to the primary clarifier overflow liquor either simultaneously, particulated solid first, then carbohydrate polymer second, or carbohydrate polymer first, then particulated solid second.

5. The method of claim 1 wherein the weight ratio of carbohydrate polymer to particulated solid ranges from about 1:25 to about 1:2500.

6. The method of claim 5 wherein the carbohydrate polymer is a dextran having a molecular weight of from 2,000,000 to 5,000,000, and the particulated solid is selected from slaked lime, CaO, $Ca(OH)_2$, calcium carbonate, calcium aluminate, $Ca(AlO_2)_2$, cellulose filter aids, titanium oxides, and mixtures thereof.

* * * * *